US011726920B2

(12) United States Patent
Miller et al.

(10) Patent No.: US 11,726,920 B2
(45) Date of Patent: Aug. 15, 2023

(54) TAG PROCESSING FOR EXTERNAL CACHES

(71) Applicant: Rambus Inc., Sunnyvale, CA (US)

(72) Inventors: Michael Miller, Raleigh, NC (US);
Dennis Doidge, Apex, NC (US);
Collins Williams, Raleigh, NC (US)

(73) Assignee: Rambus Inc., San Jose, CA (US)

( * ) Notice: Subject to any disclaimer, the term of this patent is extended or adjusted under 35 U.S.C. 154(b) by 78 days.

(21) Appl. No.: 16/453,284

(22) Filed: Jun. 26, 2019

(65) Prior Publication Data

US 2020/0004686 A1 Jan. 2, 2020

Related U.S. Application Data

(60) Provisional application No. 62/692,427, filed on Jun. 29, 2018.

(51) Int. Cl.
*G06F 12/0895* (2016.01)
*G06F 12/0804* (2016.01)
*G06F 12/0815* (2016.01)
*G06F 12/0864* (2016.01)
*G06F 9/38* (2018.01)

(52) U.S. Cl.
CPC ........ *G06F 12/0895* (2013.01); *G06F 9/3816* (2013.01); *G06F 12/0804* (2013.01); *G06F 12/0815* (2013.01); *G06F 12/0864* (2013.01)

(58) Field of Classification Search
CPC .................................................. G06F 12/0846
USPC ......................................................... 711/203
See application file for complete search history.

(56) References Cited

U.S. PATENT DOCUMENTS

| 2013/0138892 A1* | 5/2013 | Loh ...................... G06F 12/0864 |
| | | 711/134 |
| 2014/0052920 A1* | 2/2014 | Steely, Jr. ............... G06F 13/00 |
| | | 711/122 |

(Continued)

OTHER PUBLICATIONS

Gabriel H. Loh and Mark D. Hill, "Efficiently Enabling Conventional Block Sizes for Very Large Die-stacked DRAM Caches", Department of Computer Sciences University of Wisconsin—Madison https://pdfs.semanticscholar.org/e032/19dd2b9d118ca71930da87da5ba712a1583.pdf http://research.cs.wisc.edu/multifacet/papers/micro11_missmap.pdf.

(Continued)

*Primary Examiner* — Charles Rones
*Assistant Examiner* — Jonah C Krieger
(74) *Attorney, Agent, or Firm* — Lowenstein Sandler LLP (57) ABSTRACT

A device includes a cache memory and a memory controller coupled to the cache memory. The memory controller is configured to receive a first read request from a cache controller over an interconnect, the first read request comprising first tag data identifying a first cache line in the cache memory, and determine that the first read request comprises a tag read request. The memory controller is further configured to read second tag data corresponding to the tag read request from the cache memory, compare the second tag data read from the cache memory to the first tag data received from the cache controller with the first read request, and if the second tag data matches the first tag data, initiate an action with respect to the first cache line in the cache memory.

20 Claims, 7 Drawing Sheets

(56) References Cited

U.S. PATENT DOCUMENTS

2015/0278096 A1* 10/2015 Rolan ................. G06F 12/0895
                                                      711/135
2017/0168931 A1*  6/2017 Kim .................... G11C 11/4093
2018/0173640 A1*  6/2018 Jiang .................. G06F 12/0895
2019/0102313 A1*  4/2019 Nale ................... G06F 12/0895
2019/0294554 A1*  9/2019 Bryant ................ G06F 12/109

OTHER PUBLICATIONS

Zhe Wang et al. "Building a Low Latency, Highly Associative DRAM Cache with the Buffered Way predictor", semanticScholar.org https://pdfs.semanticscholar.org/e032/19dd2b9d118ca71930da87c1a5ba712a1583.pdf.

* cited by examiner

TAG PROCESSING FOR EXTERNAL CACHES

RELATED APPLICATION

This application claims the benefit of U.S. Provisional Application Ser. No. 62/692,427, filed Jun. 29, 2018, which is hereby incorporated by reference in its entirety.

TECHNICAL FIELD

This disclosure relates to the field of memory systems and, in particular, to tag processing for external caches.

BACKGROUND

Modern computer systems generally include a data storage device, such as a memory component. The memory component may be, for example a random access memory (RAM) or a dynamic random access memory (DRAM). The memory component includes memory banks made up of storage cells which are accessed by a memory controller or memory client through a command interface and a data interface within the memory component.

BRIEF DESCRIPTION OF THE DRAWINGS

The present disclosure is illustrated by way of example, and not by way of limitation, in the figures of the accompanying drawings.

DETAILED DESCRIPTION

The following description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Described herein is a system and method for tag processing for external caches. In one embodiment, a hierarchical memory system has cache tags and cache data (i.e., cache lines) stored together in the cache. In one embodiment, the cache tags may be stored together in a designated tag storage area of the cache, which may be on the same physical storage device as the cache lines or on a separate storage device dedicated for storing the cache tags. Depending on the implementation, the cache may be a direct-mapped cache, a fully associative cache, an N-way, set associative cache, or may have some other placement policy or format. In one embodiment, the cache memory is separated from the processing device that makes use of the cache data by an interconnect. Tag processing logic that can compare stored tags to access requests, translate memory addresses and identify and read cache lines corresponding to cache tags can be located in a memory controller of the cache memory so as to avoid multiple unnecessary trips across the interconnect.

When data from a main memory is stored in a cache memory, such as to enable faster access to frequently used data, a cache tag is often used to uniquely identify the corresponding piece of data. When the data is requested, a memory controller can compare the stored cache tag to a tag provided by the requestor to ensure that the proper piece of data is retrieved from the cache. In one embodiment, the cache tag comprises a portion of a memory address of the cache line from the main memory. For example, some designated number of the most significant bits of the memory address may be used as the cache tag.

In larger caches, the cache control logic (e.g., cache controller) and the tag and data memories can be separated by a bus interface or other interconnect. Transmitting data access requests and responses across this interconnect can result in significant latency. When multiple trips across the interconnect are used as part of a transaction (e.g., a tag read request is sent from the cache controller to the cache memory across the interconnect, the requested tag data is returned, a data read request is sent across the interconnect, and the requested cache data is returned) the latencies can be amplified. This is especially true when the tag and data memories are implemented in off-chip, external memory.

In one embodiment, which may address potential problems in caches, a read tag command is used to indicate to the memory controller that a received request should be interpreted as a request to read tag data and that if a tag hit is found, a subsequent request for the data should be expected from the cache controller. The indication can take the form of using different identifier or other user mode signals, depending on the embodiment. This indication enables the memory controller to initiate some action before the subsequent read request is received. For example, tag logic either within the memory controller or between the memory controller and the interconnect, can receive a read request with an associated memory address, determine the set in the cache corresponding to the address, locate the tag data for that set, perform a tag comparison to determine whether there is a cache hit, and then either take action to prepare for a request to read the cache line or autonomously perform a read of the cache line identified in the memory address and optionally return the cache data to the cache controller. In one embodiment, the tag logic can still return the requested tag data to the cache controller so that the cache controller will know the status of the request and be able to makes its own determination of whether there is a cache hit. Taking this preemptive action without waiting for the subsequent read request to be received from the cache controller reduces the number of traversals of the interconnect between the cache controller and the cache and reduces the overall latency associated with performing a memory access operation. Additional details are provided below with respect to FIGS. 1-7.

Figure 1:
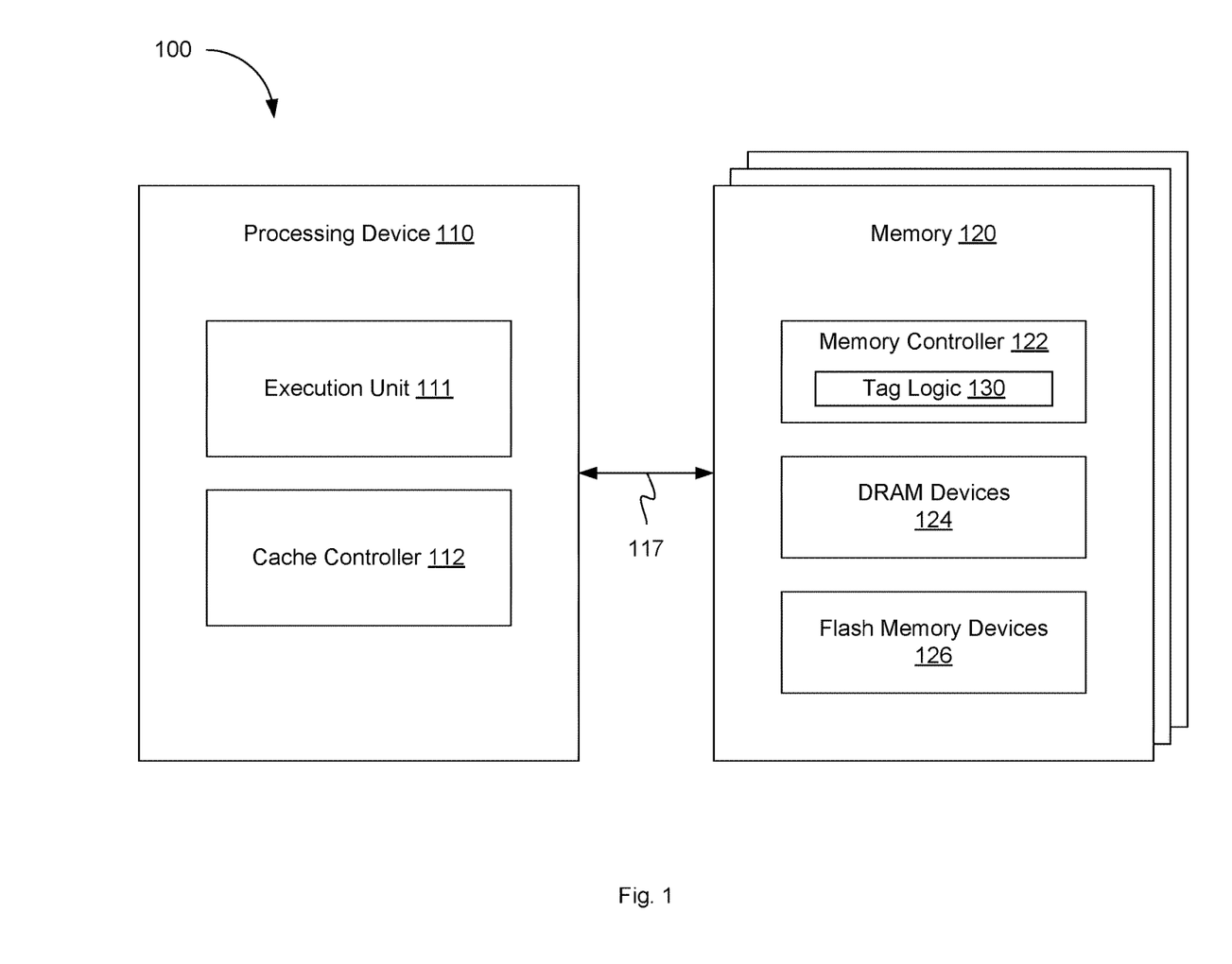
FIG. 1 is a block diagram illustrating a computing system with a cache, according to an embodiment.

FIG. 1 is a block diagram illustrating a computing system with a cache, according to an embodiment. In one embodiment, the computing system 100 includes processing device 110 and memory module 120. While only a single computing device is illustrated, the term "computing device" shall also be taken to include any collection of machines that individually or jointly execute a set (or multiple sets) of instructions to perform any one or more of the methodologies discussed herein.

Processing device 110 may be, for example, a multi-core processor including multiple cores. These cores may be physical processors, and may include various components such as front end units, execution units and back end units. Processing device 110 may represent one or more general-purpose processing devices such as a microprocessor, central processing unit, or the like. Processing device 110 may implement a complex instruction set computing (CISC) architecture, a reduced instruction set computer (RISC) architecture, a very long instruction word (VLIW) architecture, or other instruction sets, or a combination of instruction sets, through translation of binary codes in the above mentioned instruction sets by a compiler. Processing device 110 may also be one or more special-purpose processing devices such as an application specific integrated circuit (ASIC), a field programmable gate array (FPGA), a digital signal processor (DSP), network processor, or the like. Processing device 110 may be configured to execute processing logic for performing the operations discussed herein.

Processing device 110 may employ execution units including logic to perform algorithms for process data, such as in the embodiments described herein. In this illustrated embodiment, processing device 110 includes one or more execution units 111 to implement an algorithm that is to perform at least one instruction. One embodiment may be described in the context of a single processor system, but alternative embodiments may be included in a multiprocessor system. The processing device 110 may be coupled to a processor bus or interconnect 117 that transmits data signals between the processing device 110 and other components either internal or external to computing system 100.

Execution unit 111, including logic to perform integer and floating point operations, also resides in the processing device 110. The processing device 110, in one embodiment, includes a microcode (μcode) ROM to store microcode, which when executed, is to perform algorithms for certain macroinstructions or handle complex scenarios. Here, microcode is potentially updateable to handle logic bugs/fixes for processing device 110. In one embodiment, processing device 110 further includes cache controller 112 and an optional processing device cache (not shown). The processing device cache, however, may be limited in size and/or capacity. Thus, cache controller 112 may further utilize a separate cache implemented in one of memory modules 120. Depending on the embodiment, memory module 120 may be internal (e.g., on the same chip or package) or external to computing system 100. In either embodiment, data transmissions between processing device 110 and memory modules 120 may traverse interconnect 117. Each of memory modules 120 may include a memory controller 122, dynamic random access memory (DRAM) devices 124 and flash memory devices 126 and/or other non-volatile memory devices. In addition, or in the alternative, memory module 120 may include read-only memory (ROM), synchronous DRAM (SDRAM), Rambus DRAM (RDRAM), static random access memory (SRAM), etc. In other embodiments, memory module 120 may include some other type of storage device for storing information in a form (e.g., software, processing application) readable by a machine (e.g., a computer). In one embodiment, memory modules 120 may be dual in-line memory modules (DIMMs), which each comprise a series of DRAM integrated circuits mounted together on a printed circuit board. Each of memory modules 120 may be coupled to processing device 110 via an individual or shared processor bus 117 or other interconnect.

In one embodiment, the flash memory devices 126, or other non-volatile memory devices on memory module 120 may be used as a main memory for computing system 100. These flash memory devices 126, however may be slower, thus causing latencies in access times by processing device 110. Accordingly, the DRAM devices 124 or other volatile memory device on memory module 120 may be used as a cache memory to reduce the average memory access times. In one embodiment, the cache memory may be located on one of memory modules 120 while the corresponding main memory may be located on another one of memory modules 120. The cache memory may use smaller, faster DRAM devices 124 to store copies of data from the most frequently used locations in flash memory devices 126. Data may be transferred between flash memory devices 126 and DRAM device 124 in blocks of fixed size, called cache lines. When a cache line is copied from flash memory devices 126 into DRAM devices 124, a cache entry is created. The cache entry may include the copied data as well as an identifier formed from the requested memory location (i.e., the tag). In one embodiment, memory controller 122 includes tag logic 130 which coordinates the storage of tag data for multiple sets together in a single set of the cache memory. In one embodiment, memory controller 122 may be designated to manage operations of either DRAM devices 124, flash memory device 126 or both. In one embodiment, memory controller 122 may have multiple channels by which it can individually control DRAM devices 124 and flash memory devices 126. For example, memory controller 122 may receive data access requests (e.g., either for tag data, cache lines, or main memory addresses) and read or write data from the corresponding location on one of DRAM devices 124 or flash memory devices 126.

When cache controller 112 needs to read from or write to a location in memory, the cache controller 112 may instruct memory controller 122 to first check whether a copy of the relevant data is currently cached in DRAM devices 124. If the data is found in DRAM devices 124, cache controller 112 may read from or write to the cache. These cache accesses may typically be much faster than reading from or writing to flash memory devices 126. In one embodiment, as long as most memory accesses are cached memory locations on DRAM devices 124, the average latency of memory accesses will be closer to the cache latency than to the latency of main memory. Depending on the architecture, computing system 100 may include a single internal cache or multiple levels of internal caches. Other embodiments include a combination of both internal and external caches depending on the particular implementation and needs.

Figure 2:
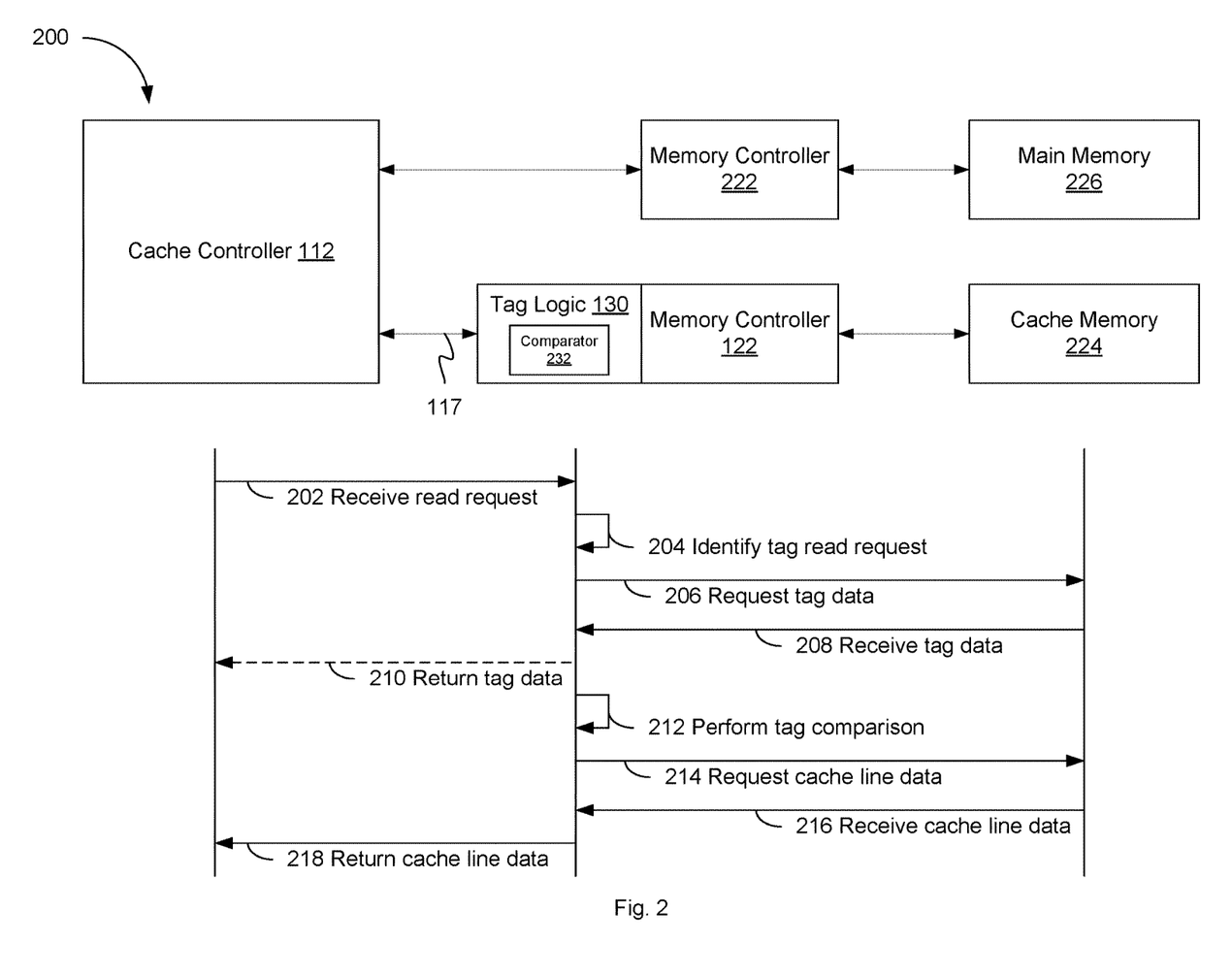
FIG. 2 is a block diagram illustrating an environment for storing tags and data in a cache, according to an embodiment.

FIG. 2 is a block diagram illustrating an environment for storing tags and data in a cache, according to an embodiment. In one embodiment, the environment 200 includes cache controller 112, cache memory 224, and main memory 226. As discussed above, cache memory 224 may be implemented on DRAM devices 124 and main memory 226 may be implemented on flash memory devices 126. Depending on the embodiment, cache memory 224 may have designated memory controller 122 and main memory 226 may have designated memory controller 222. In other embodiments, cache memory 224 and main memory 226 may share a common memory controller. In one embodiment, tag logic 130 may be implemented within memory controller 122. In other embodiments, tag logic 130 may be standalone logic located between cache controller 112 and memory controller 122, but located across an interconnect 117 from cache controller 112 and on the same side of the interconnect 117 as memory controller 122. Tag logic 130 may determine how much space is needed to store the tags for the data in cache memory 224. Upon determining such, tag logic 130 can reserve space in cache memory 224 for tag storage. To reserve the space, tag logic 130 may mark entries corresponding to the reserved space as unavailable for storing cache lines in a cache memory address mapping table or other data structure managed by memory controller 122. Upon reserving space for cache tag storage, tag logic 130 can add tag data for each cache line stored in cache memory 224 to the reserved tag space.

In the sequence of operations illustrated in FIG. 2, tag logic 130 performs tag processing for cache memory 224 in a manner that minimizes or at least reduces latency associated with traversing interconnect 117 between cache controller 112 and memory controller 122. At 202, tag logic 130 receives a first read request from cache controller 112 over interconnect 117. In one embodiment, the first read request specifies a memory address for a location in main memory 226, which includes first tag data identifying a first cache line in cache memory 224. At 204, tag logic 130 determines that the first read request comprises a tag read request. In one embodiment, tag logic 130 reads an identifier, modifier, signal, or other indication in the read request that indicates to tag logic 130 that the first read request is actually a tag read request. At 206, tag logic 130 determines the set in cache memory 224 corresponding to the memory address, locates second tag data for that set and requests the second tag data from cache memory 224. At 208, tag logic 130 receives the requested tag data. At 210, tag logic 130 optionally returns the tag data to cache controller 112 over interconnect 117.

At 212, tag logic 130 compares the second tag data from cache memory 224 to the first tag data received from cache controller 112 with the first read request. In one embodiment, tag logic 130 employs comparator 232 to determine if the second tag data matches the first tag data. In one embodiment, comparator 232 includes a digital hardware electronic device that takes two numbers as input in binary form and determines whether one number is greater than, less than or equal to the other number. In another embodiment, comparator 232 is implemented in software executed by a processing device. In yet another embodiment, comparator 232 includes an analog hardware device that compares two voltages or currents and outputs a digital signal indicating which is larger, or if they are equal. If comparator 232 indicates that the second tag data matches the first tag data, tag logic 130 initiates an action with respect to the first cache line in cache memory 224. For example, at 214, tag logic 130 determines a location of the first cache line in cache memory 224 and requests the first cache line from cache memory 224 before any subsequent read request is received from cache controller 112 over interconnect 117. At 216, tag logic 130 receives the requested cache line. At 218, tag logic 130 returns the cache line data to cache controller 112 over interconnect 117 without cache controller 112 having to issue another read request. In other embodiments, tag logic 130 may initiate some other action, as will be described in more detail below.

Figure 3:
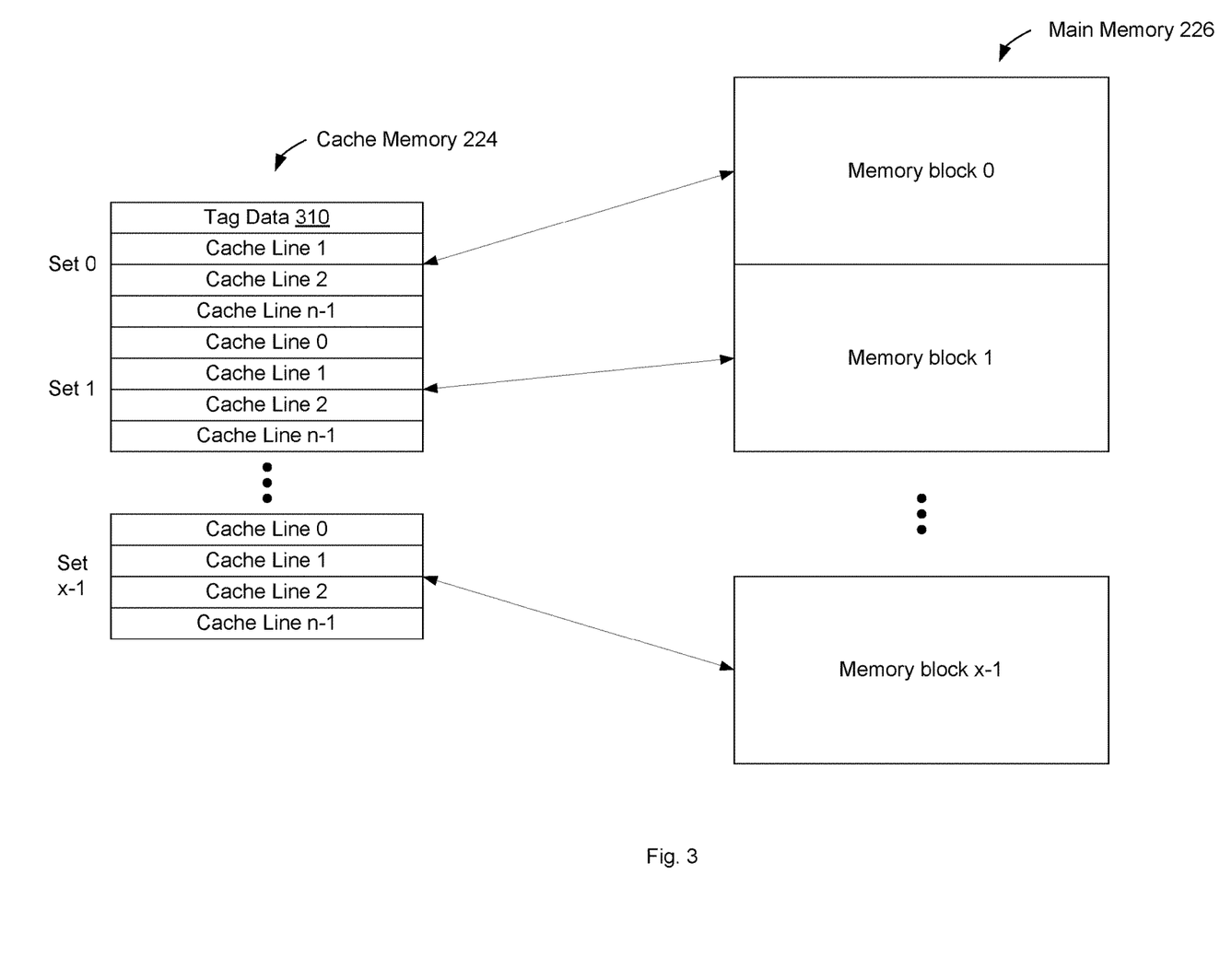
FIG. 3 is a block diagram illustrating the storage of tags and data in an associative cache, according to an embodiment.

FIG. 3 is a block diagram illustrating the storage of tags and data in an associative cache, according to an embodiment. In one embodiment, cache memory 224 is used to temporarily store a portion of data from main memory 226 to improve average data access times. As described above, cache memory 224 may be a fully associative cache, a direct mapped cache, or an N-way set associative cache. Associativity is a property of cache memory defining where any individual cache line can be stored. In a fully associative cache, a cache line being added to the cache can be stored at any location within the cache memory. In a direct mapped cache, each cache line has a designated location within the cache memory and that location is the only place that the cache line can be stored. An N-way set associative cache, as illustrated in FIG. 3, forms a compromise between these two extreme approaches. In one embodiment, main memory 226 includes x number of memory blocks. (i.e., memory block 0, memory block 1, . . . memory block x−1). Each of these memory blocks is associated with a particular set of N number of locations within cache memory 224. Each of the locations within a set where a cache line may be stored may be referred to as a "way." In this model, since a particular memory block in main memory 226 contains potentially many more lines of data than can fit in its corresponding memory set, the data from that particular memory block may be stored in any of the N-ways of the corresponding set. For example, if N=4, a cache line from memory block 1 of main memory 226 may be stored in any of 4 ways in set 1 of cache memory 224 (i.e., cache line 0, cache line 1, cache line 2, cache line n−1).

As illustrated in FIG. 3, in one embodiment, tag data 310 for the cache lines in cache memory 224 can be stored in the space that would normally be occupied by one of the ways. In this example, tag data 310 is stored in the location of what would have been way 0 of set 0. As a result, one fewer cache line may be stored in set 0 than in the other sets of cache memory 224. Tag data 310 may include tags for the cache lines stored, not just in set 0, but in all of the sets 0 through x−1 in cache memory 224, or at least a subset of those sets, space permitting. Depending on the embodiment, tag data 310 may be located at some other location, or at multiple locations, within cache memory 224. For example, tag data 310 need not necessarily reside in the location of what would have been the first way of the first set, and can instead be stored at the location of any of the ways in any of the sets. In other embodiments, tag data 310 may be stored at other locations in cache memory 224 or even on a dedicated storage device, separate from cache memory 224

Figure 4:
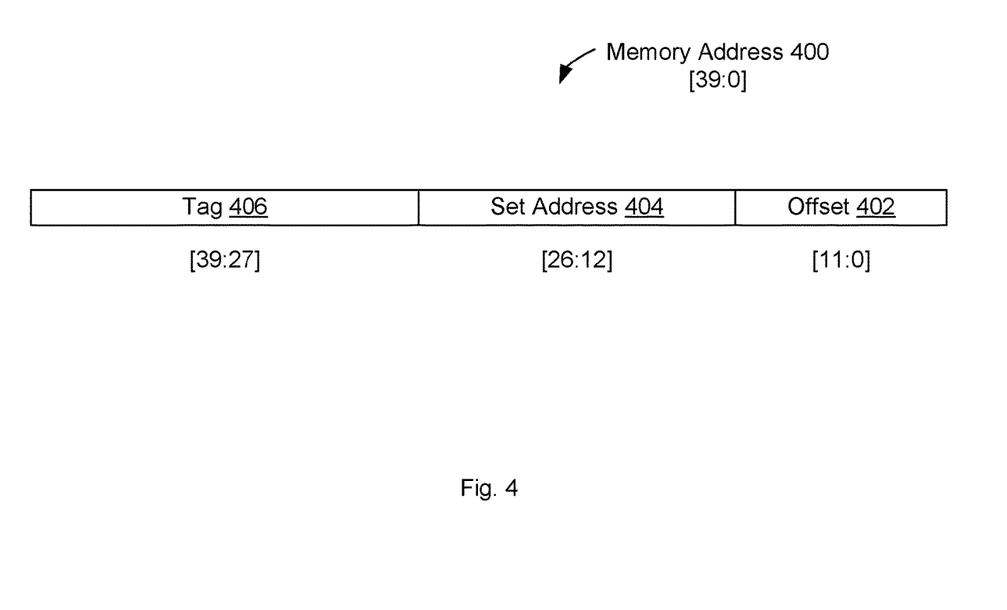
FIG. 4 illustrates a memory address, according to an embodiment.

FIG. 4 illustrates a memory address, according to an embodiment. In one embodiment, memory address 400 is a reference to a specific location in main memory 226. The memory address 400 can also be used to reference cache lines when stored in cache memory 224. Consider the following example. If main memory 226 has a capacity of one terabyte (TB), 40 address bits can be used to reference memory locations. Thus, memory address 400 can include 40 bits [39:0]. In one embodiment, a portion of the data from main memory 226, identified by memory address 400, can be stored in cache memory 224. In one embodiment, cache memory 224 is a 32-way, set associative cache with 4 kilobyte (KB) cache blocks. If cache memory 224 has a capacity of 4 gigabytes (GB) this results in $2^{15}$ sets. In one embodiment, the least significant 12 bits [11:0] of memory address 400 can be used as an offset 402. The offset 402 is used to identify a particular location within the cache line stored in cache memory 224. For example, once the cache line is identified by finding the right set and way, the particular byte or bytes within the cache line can be identified using the offset 402. The next 15 bits [26:12] are referred to as the set address 404 and are used to identify the particular set in cache memory 224 that contains the requested data. The remaining most significant 13 bits [39:27] are used as tag 406. The tag 406 is used to distinguish different memory addresses that can be placed in the set identified by set address 404. When a particular piece of data is requested from the cache memory 224, cache controller 112 may compare the tag of the requested data to the tag of each stored cache line to identify the correct data. In one embodiment, as described above, the tags for each cache line from multiple sets are stored together in a designated area in a single set as tag data 310.

Figure 5:
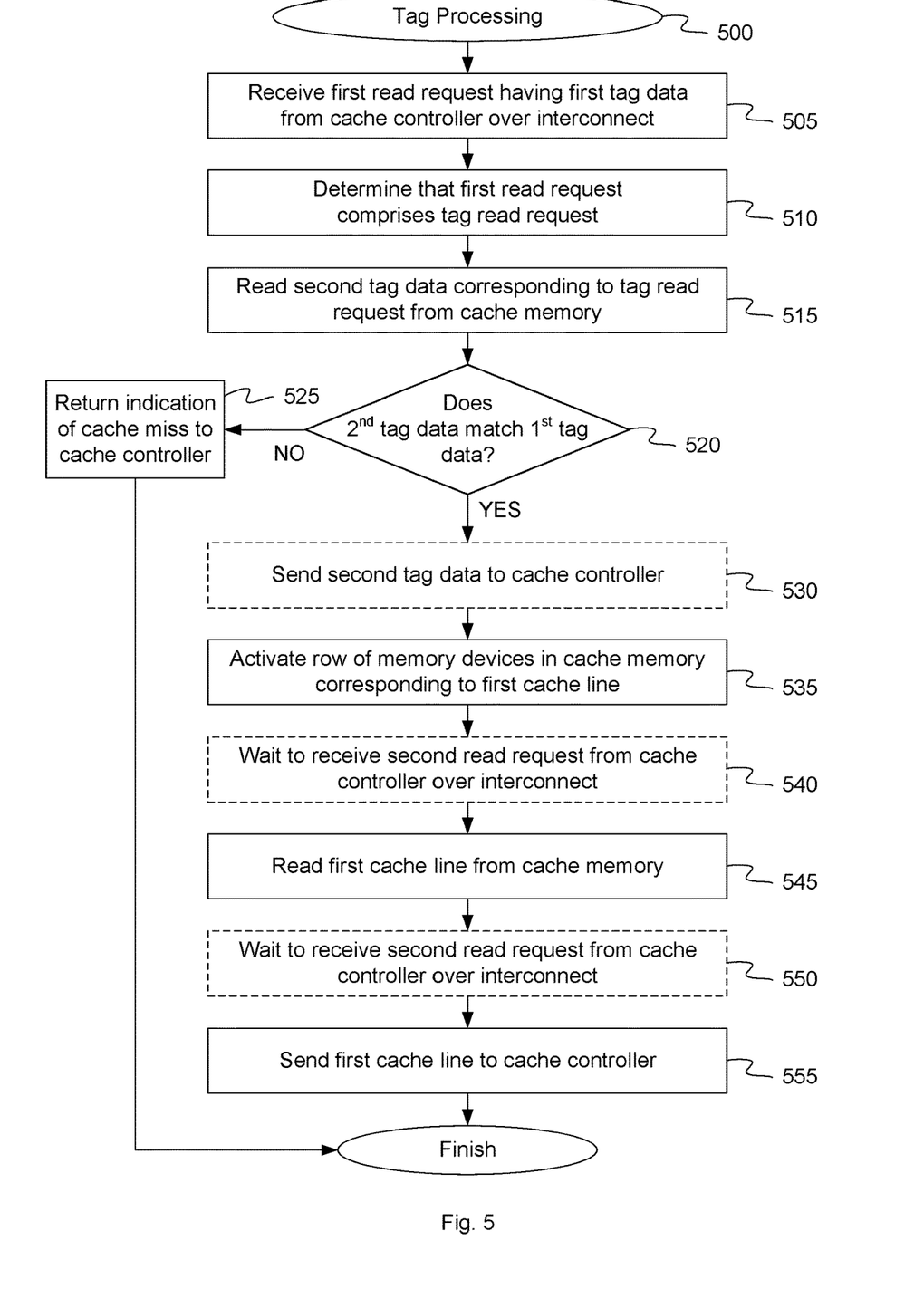
FIG. 5 is a flow diagram illustrating a method for tag processing in a cache, according to an embodiment.

FIG. 5 is a flow diagram illustrating a method for tag processing in a cache, according to an embodiment. The method 500 may be performed by processing logic that may comprise hardware (e.g., circuitry, dedicated logic, programmable logic, microcode, etc.), software (e.g., instructions run on a processing device to perform hardware simulation), or a combination thereof. The processing logic may receive read requests from a cache controller, identify the read requests as tag read requests and initiate actions with respect to particular cache lines in order to reduce latencies associated with traversing an interconnect. In one embodiment, the method 500 is performed by tag logic 130, as shown in FIGS. 1 and 2.

Referring to FIG. 5, at block 510, method 500 receives a first read request from a cache controller 112 over an interconnect 117. In one embodiment, cache controller 112 receives a request to access a particular cache line from memory module 120. The request may be received from execution unit 111 or from some other processing device in computing system 100. In one embodiment, cache controller 112 forwards the request to memory controller 122. In one embodiment, the request comprises a first read request that specifies a memory address for a location in main memory 226, which includes first tag data identifying the first cache line in cache memory 224.

At block 510, method 500 determines that the first read request comprises a tag read request. In one embodiment, tag logic 130 reads an identifier, modifier, signal, or other indication in the read request that indicates to tag logic 130 that the first read request is actually a tag read request. For example, the read request may include a user identifier field, where the presence of a particular value in the user identifier field serves to notify tag logic 130 of the tag read request.

At block 515, method 500 reads second tag data corresponding to the tag read request from the cache memory 224. In one embodiment, the location of tag data 310 is known by tag logic 130 and when a request is received from cache controller 112, tag logic instructs memory controller 122 read tag data 310 from the known location (i.e., the location that would normally be occupied by set 0, way 0 in cache memory 224). The request from cache controller 112 may include the tag 406, set address 404, and offset 402 of the requested cache line.

At block 520, method 500 compares the second tag data read from the cache memory 224 to the first tag data received from the cache controller 112 with the first read request to determine whether the second tag data matches the first tag data. In one embodiment, tag logic 130 locates the tags in tag data 310 for a particular set identified by set address 404 where the requested cache line is stored. Tag logic 130 can compare the tag 406 of the requested cache line to each of the tags stored in tag data 310 for that particular set. Tag logic 130 can identify the requested cache line as having a stored in tag data 310 that matches the tag 406 from the request. The location of the matching stored tag within tag data 310 identifies the set and way in cache memory 224 where the corresponding cache line is located.

If the second tag data does not match the first tag data, at block 525, method 500 returns an indication of a cache miss to the cache controller 112. If the second tag data matches the first tag data, however, at block 530, method 500 optionally sends the second tag data read from the cache memory 224 to the cache controller 112 over the interconnect 117.

At block 535, method 500 initiates an action with respect to the first cache line in the cache memory 224. For example, in one embodiment, tag logic 130 prepares cache memory 224 for an upcoming memory access operation. For example, tag logic 130 may activate a row of DRAM devices 124 corresponding to the first cache line before a second read request is received from the cache controller 112 over the interconnect 117. In one embodiment, at block 540, method 500 then optionally waits to receive the second read request from the cache controller 112 over the interconnect 117. Tag logic 130 anticipates that the subsequent read request will be forthcoming. By preparing at least a portion of cache memory 224 (e.g., by activating the corresponding row of DRAM devices 124, sending a pre-charge command, etc.) ahead of time, tag logic 130 can service the second read request faster than if it had to wait to activate the row after the request was received. If method 500 does wait to receive the second read request at block 540, then method 500 need not wait again at block 550 below. In other embodiments, however, rather than waiting to receive the second read request, method 500 may proceed directly to block 545.

At block 545, method 500 reads the first cache line from the cache memory 224. In one embodiment, tag logic 130 instructs memory controller 122 to retrieve the cache line from the identified set and way in cache memory 224. In one embodiment, at block 550, method 500 optionally waits to receive the second read request from the cache controller 112 over the interconnect 117. Tag logic 130 anticipates that the subsequent read request will be forthcoming. By reading the first cache line from cache memory 224 ahead of time, tag logic 130 can service the second read request faster than if it had to wait to read the cache line after the request was received. In one embodiment, method 500 waits at block 550 if there was not a wait at block 540 above. In other embodiments, however, rather than waiting to receive the second read request at all, method 500 may proceed directly to block 555.

At block 555, method 500 sends the first cache line to the cache controller 112. In one embodiment, this occurs before the second read request is received from the cache controller 112 over the interconnect 117. In one embodiment, since the cache line data has been returned to cache controller 112, the second read request may never actually be sent to or received by memory controller 122/tag logic 130.

In one embodiment, tag logic 130 may instead return both tag data and cache data as a matter of course upon determining that there is a cache it in response to the first read request. In one embodiment, the first read request from cache controller 112 would be sized to get all the tag data and actual cache data needed, or at least the first chunk. Tag logic 130 performs a tag read, as described above, and returns the tag data to cache controller 112, but then suspends the rest of the transaction while it evaluates the tag hit status (i.e., performs the tag comparison). Based on hit status, tag logic 130 does one of two things. If there is a cache hit, tag logic 130 generates a data read request to cache memory 224, receives the cache line data, and returns that data to cache controller 112 by resuming the suspended transaction. If there is a cache miss, tag logic 130 resumes the suspended transaction immediately and generates 'garbage' data to be sent to cache controller 112 without making a read data request to the cache memory 114. In either case, the cache controller 114 still receives the tag data, which allows it to know if the cache data is valid or garbage. In addition, the cache controller 114 knows the correct address to use for subsequent reads to same cache block.

In yet another embodiment, tag logic 130 receives a write request from cache controller 114. In this case, tag logic 130 determines the tag hit status, as described above, and determines the location of the cache line from the write request. If there is a cache hit, tag logic 130 performs the write with the data received in the request. If there is a cache miss, tag logic 130 does not perform the write and drops the data.

Figure 6:
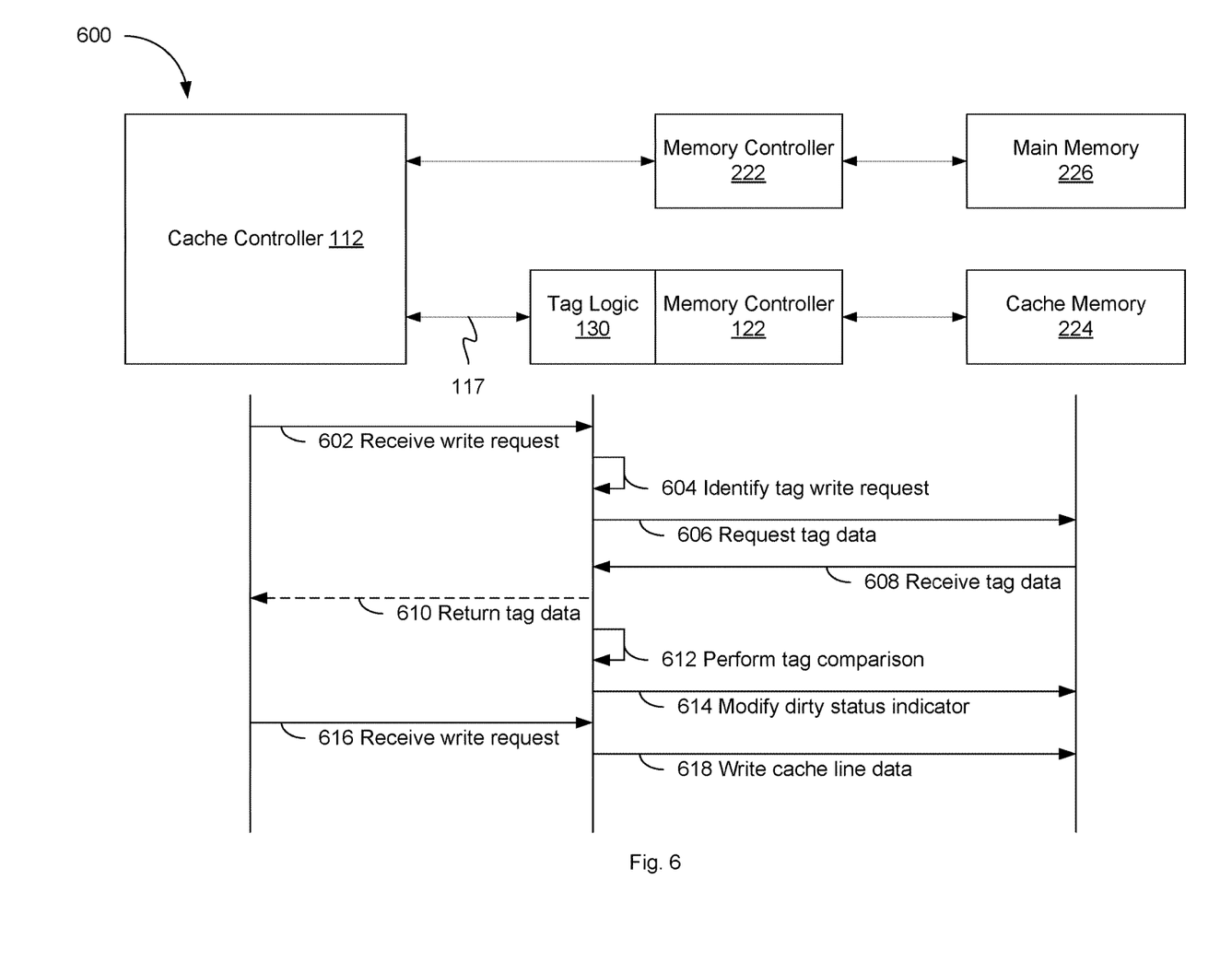
FIG. 6 is a block diagram illustrating dirty flag modification in a remote cache, according to an embodiment.

FIG. 6 is a block diagram illustrating dirty flag modification in a remote cache, according to an embodiment. In one embodiment, the environment 600 includes cache controller 112, cache memory 224, and main memory 226. As discussed above, cache memory 224 may be implemented on DRAM devices 124 and main memory 226 may be implemented on flash memory devices 126. Depending on the embodiment, cache memory 224 may have designated memory controller 122 and main memory 226 may have designated memory controller 222. In other embodiments, cache memory 224 and main memory 226 may share a common memory controller. In one embodiment, tag logic 130 may be implemented within memory controller 122. In other embodiments, tag logic 130 may be standalone logic located between cache controller 112 and memory controller 122, but located across an interconnect 117 from cache controller 112 and on the same side of the interconnect 117 as memory controller 122.

In the sequence of operations illustrated in FIG. 6, tag logic 130 performs tag processing for cache memory 224 in a manner that minimizes or at least reduces latency associated with traversing interconnect 117 between cache controller 112 and memory controller 122. At 602, tag logic 130 receives a first write request from cache controller 112 over interconnect 117. In one embodiment, the first write request specifies a memory address for a location in main memory 226, which includes first tag data identifying a first cache line in cache memory 224. At 604, tag logic 130 determines that the first write request comprises a tag write request. In one embodiment, tag logic 130 reads an identifier, modifier, signal, or other indication in the write request that indicates to tag logic 130 that the first write request is actually a tag write request. At 606, tag logic 130 determines the set in cache memory 224 corresponding to the memory address, requests the second tag data from cache memory 224. At 608, tag logic 130 receives the requested tag data. At 610, tag logic 130 optionally returns the tag data to cache controller 112 over interconnect 117.

At 612, tag logic 130 compares the second tag data from cache memory 224 to the first tag data received from cache controller 112 with the first write request. If there is a cache miss (i.e., the second tag data does not match the first tag data), tag logic 130 simply returns the tag information to cache controller 114. If there is a cache hit (i.e., the second tag data matches the first tag data) and the corresponding cache line is already marked as dirty, tag logic 130 also returns the tag information to cache controller 114. If, however, there is a cache hit and the corresponding cache line is not currently marked as dirty, at 614, tag logic 130 modifies a dirty status indicator for the first cache line. For example, tag logic 130 sets an indicator to indicate that the first cache line is dirty. In one embodiment, the dirty indicator may be a single bit, set to one of two states, corresponding to some unit of the cache memory 224 (e.g., a single cache line). A first state (e.g., a logic "0") may indicate that the corresponding cache line is clean, while a second state (e.g., a logic "1") may indicate that the corresponding cache line is dirty. In other embodiments, the logic states may be reversed, or some other indicator may be used to signify whether a corresponding cache line is clean or dirty. A cache line may be considered dirty when it has been modified in cache memory 224 but that modification has not been saved to or otherwise reflected in main memory 226. Thus, when a dirty indicator is set, this is an indication to cache controller 114 that the corresponding cache line does not match the associated data in main memory 226. As such, the data in main memory 226 should be updated to reflect the changes to the corresponding cache line before the cache line is discarded (e.g., as part of a cache eviction operation). Conversely, a cache line may be considered clean when it has not been modified in the cache memory. Thus, when the dirty indicator is not set, this is an indication to cache controller 114 that the corresponding cache line matches the associated data in main memory 226 and can be safely discarded, if needed.

In one embodiment, although the cache line has not actually been modified by a write operation yet, tag logic 130 can set the dirty indicator preemptively to prevent cache controller 112 from having to send another write request across interconnect 117 to set the indicator. After having set the indicator, at 616, tag logic 130 receives a second write request from cache controller 112 over the interconnect indicating data to be written to the first cache line. At 618, tag logic writes the data to the first cache line in cache memory 224.

Figure 7:
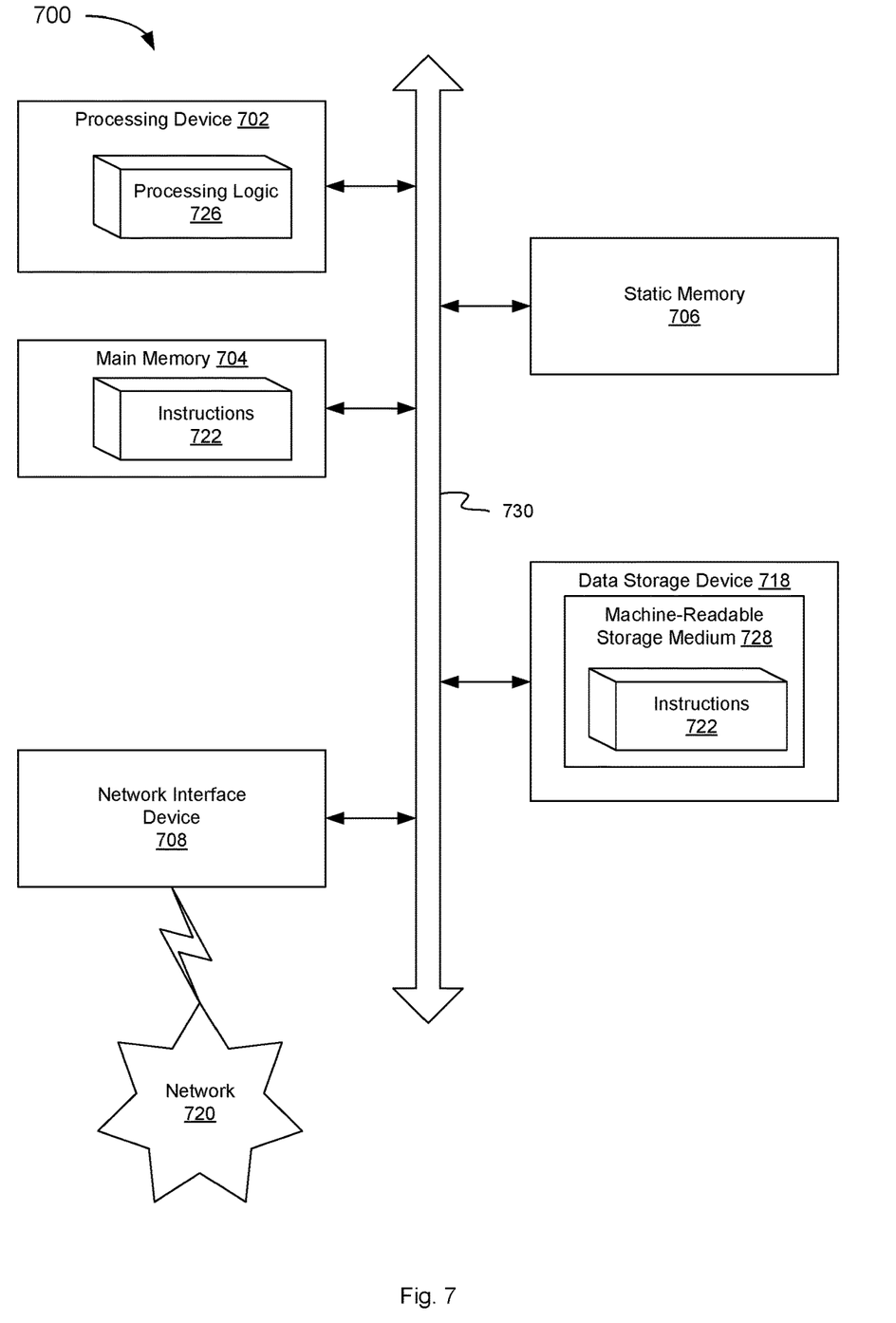
FIG. 7 depicts an example computer system which can perform any one or more of the operations described herein, in accordance with one or more aspects of the present disclosure.

FIG. 7 depicts an example computer system 700 which can perform any one or more of the methods described herein, in accordance with one or more aspects of the present disclosure. In one example, computer system 700 may correspond to a computing device capable of executing one or more of the components described herein. The computer system 700 may be connected (e.g., networked) to other computer systems in a local area network (LAN), an intranet, an extranet, or the Internet. The computer system 700 may operate in the capacity of a server in a client-server network environment. The computer system 700 may be a personal computer (PC), a tablet computer, a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 718, which communicate with each other via a bus 730.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions for performing the operations and steps discussed herein. The computer system 700 may further include a network interface device 708 to coupled computer system 700 to network 720.

The data storage device 718 may include a computer-readable medium 728 on which the instructions 722 (e.g., implementing tag logic 130) embodying any one or more of the methodologies or functions described herein is stored. The instructions 722 may also reside, completely or at least partially, within the main memory 704 and/or within the processing device 702 (where they may be referred to as processing logic 726) during execution thereof by the computer system 700, the main memory 704 and the processing device 702 also constituting computer-readable media. The instructions 722 may further be transmitted or received over a network via the network interface device 708.

While the computer-readable storage medium 728 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "setting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any procedure for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

What is claimed is:

1. A system comprising:
   a processing device comprising a cache controller;
   an interconnect coupled to the processing device; and
   a memory module coupled to the interconnect, wherein the memory module is separated from the processing device by the interconnect, the memory module comprising:
      a main memory storing data;
      a cache memory to store at least a portion of the data from the main memory, the cache memory comprising a plurality of sets of cache lines each comprising a plurality of cache storage locations, wherein a first location of a first set of the plurality of sets of cache lines comprises cache tag data for the plurality of sets of cache lines; and
      a memory controller coupled to the cache memory, wherein the memory controller comprises a comparator and is configured to:
         receive a first read request from the cache controller over the interconnect, the first read request comprising first tag data identifying a first cache line in the cache memory;
         determine that the first read request comprises a tag read request;
         read second tag data corresponding to the tag read request from the first location of the first set of the plurality of sets of cache lines in the cache memory, wherein the first cache line identified in the received first read request is part of a second set of the plurality of sets of cache lines, and wherein the second set of the plurality of cache lines is different than the first set of the plurality of cache lines comprising the first location storing the cache tag data for the plurality of sets of cache lines;
         compare, using the comparator, the second tag data read from the cache memory to the first tag data received from the cache controller with the first read request; and
         if the second tag data matches the first tag data, initiate an action with respect to the first cache line in the cache memory.

2. The system of claim 1, wherein the cache memory comprises a set associative cache implemented on a dynamic random access memory (DRAM) device.

3. The system of claim 1, wherein to determine that the first read request comprises a tag read request, the memory controller is configured to:
   read an identifier in the first read request, the identifier indicating that the first read request is a tag read request.

4. The system of claim 1, wherein the memory controller is further configured to:
   send the second tag data read from the cache memory to the cache controller over the interconnect.

5. The system of claim 1, wherein to initiate the action with respect to the first cache line, the memory controller is configured to:
   prepare a portion of the cache memory corresponding to the first cache line for a second read request to be subsequently received from the cache controller over the interconnect.

6. The system of claim 1, wherein to initiate the action with respect to the first cache line, the memory controller is configured to:
   read the first cache line from the cache memory before a second read request is received from the cache controller over the interconnect.

7. The system of claim 6, wherein to initiate the action with respect to the first cache line, the memory controller is further configured to:
   send the first cache line to the cache controller without receiving the second read request from the cache controller over the interconnect.

8. The system of claim 6, wherein to initiate the action with respect to the first cache line, the memory controller is further configured to:
   receive the second read request from the cache controller over the interconnect; and
   send the first cache line to the cache controller.

9. The system of claim 1, wherein the memory controller is further configured to:
   if the second tag data does not match the first tag data, return an indication of a cache miss to the cache controller.

10. A method comprising:
    receiving, by a memory controller, a first read request from a cache controller over an interconnect, the first read request comprising first tag data identifying a first cache line in a cache memory, wherein the cache memory is separated from the cache controller by the interconnect, the cache memory comprising a plurality of sets of cache lines each comprising a plurality of cache storage locations, wherein a first location of a first set of the plurality of sets of cache lines comprises cache tag data for the plurality of sets of cache lines;
    determining, by the memory controller, that the first read request comprises a tag read request;
    reading, by the memory controller, second tag data corresponding to the tag read request from the first location of the first set of the plurality of sets of cache lines in the cache memory, wherein the first cache line identified in the received first read request is part of a second set of the plurality of sets of cache lines, and wherein the second set of the plurality of cache lines is different than the first set of the plurality of cache lines comprising the first location storing the cache tag data for the plurality of sets of cache lines;
    comparing, by the memory controller, the second tag data read from the cache memory to the first tag data received from the cache controller with the first read request; and
    responsive to the second tag data matching the first tag data, initiating, by the memory controller, an action with respect to the first cache line in the cache memory.

11. The method of claim 10, wherein the cache memory comprises a set associative cache implemented on a dynamic random access memory (DRAM) device.

12. The method of claim 10, further comprising:
    sending the second tag data read from the cache memory to the cache controller over the interconnect.

13. The method of claim 10, wherein determining that the first read request comprises a tag read request comprises reading an identifier in the first read request, the identifier indicating that the first read request is a tag read request.

14. The method of claim 10, wherein initiating the action with respect to the first cache line comprises:
    preparing a portion of the cache memory corresponding to the first cache line for a second read request to be subsequently received from the cache controller over the interconnect.

15. The method of claim 10, wherein initiating the action with respect to the first cache line comprises:
reading the first cache line from the cache memory before a second read request is received from the cache controller over the interconnect.

16. The method of claim 15, wherein initiating the action with respect to the first cache line further comprises:
sending the first cache line to the cache controller without receiving the second read request from the cache controller over the interconnect.

17. The method of claim 15, wherein initiating the action with respect to the first cache line further comprises:
receiving the second read request from the cache controller over the interconnect; and
sending the first cache line to the cache controller.

18. The method of claim 10, further comprising:
if the second tag data does not match the first tag data, returning an indication of a cache miss to the cache controller.

19. A device comprising:
a cache memory comprising a plurality of sets of cache lines each comprising a plurality of cache storage locations, wherein a first location of a first set of the plurality of sets of cache lines comprises cache tag data for the plurality of sets of cache lines; and
a memory controller coupled to the cache memory, wherein the memory controller is configured to:
receive a first write request from a cache controller over an interconnect, the first write request comprising first tag data identifying a first cache line in the cache memory wherein the cache memory is separated from the cache controller by the interconnect;
determine that the first write request comprises a tag write request;
read second tag data corresponding to the first write request from the first location of the first set of the plurality of sets of cache lines in the cache memory, wherein the first cache line identified in the received first read request is part of a second set of the plurality of sets of cache lines, and
wherein the second set of the plurality of cache lines is different than the first set of the plurality of cache lines comprising the first location storing the cache tag data for the plurality of sets of cache lines;
compare the second tag data read from the cache memory to the first tag data received from the cache controller with the first read request;
if the second tag data matches the first tag data and the first cache line is not already marked as dirty, modify a dirty status indicator for the first cache line before a second write request is received from the cache controller over the interconnect;
receive the second write request is received from the cache controller over the interconnect;
perform a write operation on the first cache line.

20. The device of claim 19, wherein the memory controller is further configured to:
if the second tag data does not match the first tag data, send at least one of the second tag data read from the cache memory or an indication of a cache miss to the cache controller over the interconnect.

* * * * *